United States Patent
Suenaga et al.

(10) Patent No.: US 8,559,109 B2
(45) Date of Patent: Oct. 15, 2013

(54) METHOD FOR PRODUCING DIFFRACTIVE OPTICAL ELEMENT, AND DIFFRACTIVE OPTICAL ELEMENT, INCLUDING A DIFFRACTION GRATING AND MOLDED OPTICAL ADJUSTING LAYER

(75) Inventors: Tatsutoshi Suenaga, Osaka (JP); Yuka Okada, Hyogo (JP); Akiko Murata, Osaka (JP)

(73) Assignee: Panasonic Corporation, Osaka (JP)

( * ) Notice: Subject to any disclaimer, the term of this patent is extended or adjusted under 35 U.S.C. 154(b) by 479 days.

(21) Appl. No.: 12/935,190

(22) PCT Filed: Dec. 24, 2009

(86) PCT No.: PCT/JP2009/007204
§ 371 (c)(1),
(2), (4) Date: Sep. 28, 2010

(87) PCT Pub. No.: WO2010/073675
PCT Pub. Date: Jul. 1, 2010

(65) Prior Publication Data
US 2011/0026119 A1 Feb. 3, 2011

(30) Foreign Application Priority Data
Dec. 24, 2008 (JP) .................................. 2008-326923

(51) Int. Cl.
*G02B 5/18* (2006.01)
(52) U.S. Cl.
USPC ............................ 359/576; 359/900; 264/1.1
(58) Field of Classification Search
USPC ........................................................ 359/576
See application file for complete search history.

(56) References Cited

U.S. PATENT DOCUMENTS

| | | |
|---|---|---|
| 2002/0030889 A1 | 3/2002 | Sato |
| 2005/0219698 A1 | 10/2005 | Tanaka |
| 2005/0264887 A1 | 12/2005 | Sato |
| 2006/0216112 A1 | 9/2006 | Matsumoto et al. |
| 2007/0047084 A1 | 3/2007 | Tanaka |
| 2007/0172967 A1 | 7/2007 | Katagiri et al. |
| 2009/0168205 A1 | 7/2009 | Inoue |
| 2010/0134888 A1 | 6/2010 | Korenaga et al. |

FOREIGN PATENT DOCUMENTS

| | | |
|---|---|---|
| JP | 10-142410 | 5/1998 |
| JP | 10-274705 | 10/1998 |
| JP | 2002-062417 | 2/2002 |
| JP | 2002-182022 | 6/2002 |
| JP | 2005-316414 | 11/2005 |
| JP | 2006138924 A * | 6/2006 |

(Continued)

OTHER PUBLICATIONS

International Search Report for corresponding International Application No. PCT/JP2009/007204 mailed Feb. 9, 2010.

(Continued)

*Primary Examiner* — Arnel C Lavarias
(74) *Attorney, Agent, or Firm* — Renner, Otto, Boisselle & Sklar, LLP

(57) ABSTRACT

According to a method for producing a diffraction optical element, the center of a molding face and the center of a substrate are positionally aligned to each other based on a marker of a prescribed shape which is formed at the center of the molding face of a mold and the shape of a diffraction grating of the substrate. A nanocomposite material is located between the molding face and the diffraction grating, and the material is pressed by the mold and the substrate to form an optical adjusting layer on the diffraction grating.

6 Claims, 5 Drawing Sheets

(56) References Cited

FOREIGN PATENT DOCUMENTS

| JP | 2006-268015 | 10/2006 |
| JP | 2007-106002 | 4/2007 |
| WO | 2007/026597 A1 | 3/2007 |
| WO | 2007/111077 A1 | 10/2007 |

OTHER PUBLICATIONS

Form PCT/ISA/237 for corresponding International Application No. PCT/JP2009/007204 mailed Feb. 9, 2010 and partial English translation.

* cited by examiner (a)

(b)

METHOD FOR PRODUCING DIFFRACTIVE OPTICAL ELEMENT, AND DIFFRACTIVE OPTICAL ELEMENT, INCLUDING A DIFFRACTION GRATING AND MOLDED OPTICAL ADJUSTING LAYER

TECHNICAL FIELD

The present invention relates to a method for producing a diffraction optical element, and also to a diffraction optical element. Specifically, the present invention relates to a method for producing a diffraction optical element by which a protective film is provided on a surface of a lens substrate and thus the wavelength dependence of the diffraction efficiency is decreased, and also to a diffraction optical element.

BACKGROUND ART

A diffraction optical element has a grating configuration with a great number of grooves formed at a surface of a substrate which is formed of an optical material such as glass, resin or the like.

The diffraction optical element is used for various optical systems. The diffraction optical element is known to be used as, for example, a lens designed to collect diffraction light of a specific order to one point, a spatial low pass filter, a polarization hologram or the like.

The diffraction optical element has a feature of making an optical system compact. In addition, as opposed to refraction, diffraction of light is expressed to a higher degree as the light has a longer wavelength. Therefore, the diffraction optical element can be combined with an optical element of a refraction system to improve the chromatic aberration or the curvature of field in an optical system.

For assembling an optical device such as a camera or the like, the optical axes of the optical components need to be positionally aligned to each other at high precision. Patent Document No. 1 discloses a spherical lens having a marker for providing such position alignment at the center of the lens. Using such a marker, the optical components can be positioned at high precision.

CITATION LIST

Patent Literature
Patent Document No. 1: Japanese Laid-Open Patent Publication No. 2006-268015

SUMMARY OF INVENTION

Technical Problem

Ideally, the diffraction efficiency depends on the wavelength of light. The above-described diffraction optical element has a problem that when the diffraction optical element is designed to have an optimum diffraction efficiency for light of a specific wavelength, the diffraction efficiency is decreased for light of other wavelengths.

For example, when a diffraction optical element is applied to an optical system using white light such as a lens for a camera or the like, there is a problem that there is a limit on applying this diffraction optical element as a sole diffraction optical element.

In order to solve this problem, it is conceivable to form a phase-type diffraction optical element having a diffraction grating at the interface between two different types of optical materials. Such a phase-type diffraction optical element is realized by causing a second optical material formed of an ultraviolet-curable resin or the like to cover and adhere to a first optical material provided as a glass or resin substrate. By choosing optical materials having such optical characteristics that, in combination, fulfill a specific conditional expression, the diffraction efficiency at a designed order is made high regardless of the wavelength, so that the wavelength dependence of the diffraction efficiency is decreased.

However, where the second optical material is caused to cover and adhere to the first optical material, there are many problems to solve regarding the production. For example, the apex positions of the two materials need to be aligned to each other at high precision. If it is attempted to cover the level difference provided by the diffraction grating with the second optical material, the thickness of the second optical material needs to be, for example, about 20 μm or greater. With such a thickness, the optical characteristics are significantly changed even by a small positional deviation. Therefore, the position alignment needs to be done at high precision.

Patent Document No. 1 discloses, as an example of a method for forming a marker at the center of the spherical lens, a method using a mold having a concaved portion at the center of an inner surface thereof for press-molding. According to this method, a surface of the lens substrate is irradiated with light from an automatic collimator through an injection opening provided at the center of the mold, and the position of the lens substrate and the central position of the mold are adjusted in accordance with the position of the light reflected by the lens substrate. However, such a method causes a recognition error which is dependent on the curvature of the lens substrate. For example, when the curvature of the lens substrate is small, the change of the reflected light is relatively large. In this case, the center of the lens substrate can be found. By contrast, however, when the curvature is large, the change of the reflected light is small. In this case, it is difficult to find the center of the lens substrate.

The present invention, made in light of the above-described problems, provides a diffraction optical element offering high precision and high-level functions without complicating the structure or the production steps thereof.

Solution to Problem

A method for producing a diffraction optical element according to the present invention is a method for producing a diffraction optical element including a substrate formed of a first optical material containing a first resin and having a diffraction grating configuration at a surface thereof; and an optical adjusting layer formed of a second optical material containing a second resin and formed on the diffraction grating configuration of the substrate. The method includes the steps of positionally aligning the center of a molding face of a mold and the center of the diffraction grating configuration of the substrate, based on a marker of a prescribed shape which is formed at the center of the molding face of the mold and the diffraction grating configuration of the substrate; locating a starting material of the second optical material between the molding face of the mold and the diffraction grating configuration of the substrate; and pressing the starting material of the second optical material by the mold and the substrate to form the optical adjusting layer on the diffraction grating configuration.

According to an embodiment, the step of positionally aligning includes the step of positionally aligning the center of the diffraction grating configuration found based on a plurality of pairs of coordinates on the diffraction grating configuration and the marker.

According to an embodiment, the step of positionally aligning includes the step of positionally aligning a ring band of the diffraction grating configuration and the marker.

According to an embodiment, the step of positionally aligning includes the step of positionally aligning an innermost ring band of the diffraction grating configuration and the marker.

According to an embodiment, the step of positionally aligning includes the steps of detecting the innermost ring band of the diffraction grating configuration; and setting the marker at a position inner to the innermost ring band.

According to an embodiment, the marker is a concaved portion or a convexed portion formed at the molding face.

According to an embodiment, the marker has a length of is 50 μm or less along the molding face and a depth of 50 μm or less from the molding face.

A diffraction optical element according to the present invention includes a substrate formed of a first optical material containing a first resin and having a diffraction grating configuration at a surface thereof; and an optical adjusting layer formed of a second optical material containing a second resin and formed on the diffraction grating configuration of the substrate. The optical adjusting layer is molded on the substrate using a mold having a marker of a prescribed shape at the center of a molding face; and a concaved portion or a convexed portion of a prescribed shape in accordance with a shape of the marker is formed at a surface of the optical adjusting layer, the surface being opposite to the substrate.

According to an embodiment, the concaved portion or the convexed portion of the optical adjusting layer is located inner to an innermost ring band of the diffraction grating configuration of the substrate.

According to an embodiment, the first optical material has a lower refractive index and is more highly dispersable than the second optical material.

According to an embodiment, the first optical material contains polycarbonate.

According to an embodiment, the second optical material is a composite material containing a resin and inorganic particles.

According to an embodiment, the inorganic particles contain at least one oxide among zirconium oxide, yttrium oxide, lanthanum oxide, alumina and silica as a main component.

In a method for detecting a molding error of a diffraction optical element according to the present invention, the diffraction optical element includes a substrate formed of a first optical material containing a first resin and having a diffraction grating configuration at a surface thereof; and an optical adjusting layer formed of a second optical material containing a second resin and formed on the diffraction grating configuration of the substrate. The optical adjusting layer is molded on the substrate using a mold having a marker of a prescribed shape at the center of a molding face; and a concaved portion or a convexed portion of a prescribed shape in accordance with a shape of the marker is formed at a surface of the optical adjusting layer, the surface being opposite to the substrate. The method includes the steps of positionally aligning a first sign displayed on a display device and a ring band of the diffraction grating configuration; and detecting a positional relationship between a second sign displayed on the display device in correspondence with the first sign and the concaved portion or the convexed portion of the optical adjusting layer.

According to an embodiment, the first sign and the innermost ring band of the diffraction grating configuration are positionally aligned to each other.

A method for producing a diffraction optical element according to the present invention is a method for producing a diffraction optical element including a substrate formed of a first optical material containing a first resin and having a diffraction grating configuration at a surface thereof; and an optical adjusting layer formed of a second optical material containing a second resin and formed on the diffraction grating configuration of the substrate. The method includes the steps of locating a starting material of the second optical material between a first mold having a molding face usable for molding the optical adjusting layer and a second mold for regulating a position of the substrate; putting the first mold and the second mold into engagement with each other; and pressing the starting material of the second optical material by the molds and the substrate to form the optical adjusting layer on the diffraction grating configuration.

According to an embodiment, the starting material of the second optical material is photocurable; the second mold has an opening: and the method further comprises the step of irradiating the starting material of the second optical material with light via the opening of the second mold and the substrate, thereby curing the starting material of the second optical material.

According to an embodiment, the starting material of the second optical material is photocurable; the second mold is formed of a photo-transmissive material; and the method further comprises the step of irradiating the starting material of the second optical material with light via the second mold, thereby curing the starting material of the second optical material.

According to an embodiment, the starting material of the second optical material is photocurable; the first mold is formed of a photo-transmissive material; and the method further comprises the step of irradiating the starting material of the second optical material with light via the first mold, thereby curing the starting material of the second optical material.

According to an embodiment, the starting material of the second optical material is ultraviolet-curable; and the starting material of the second optical material is irradiated with ultraviolet, thereby being cured.

According to an embodiment, the optical adjusting layer is formed in a space between the molding face and the diffraction grating configuration, the space being formed when the first mold and the substrate are directly pressed to each other.

Advantageous Effects of Invention

According to the present invention, the decentration of the lens substrate and the optical adjusting layer can be suppressed at high precision. Owing to this, a diffraction optical element having splendid optical characteristics can be provided.

DESCRIPTION OF EMBODIMENTS

Hereinafter, embodiments of the present invention will be described with reference to the drawings.

Embodiment 1

Figure 1:
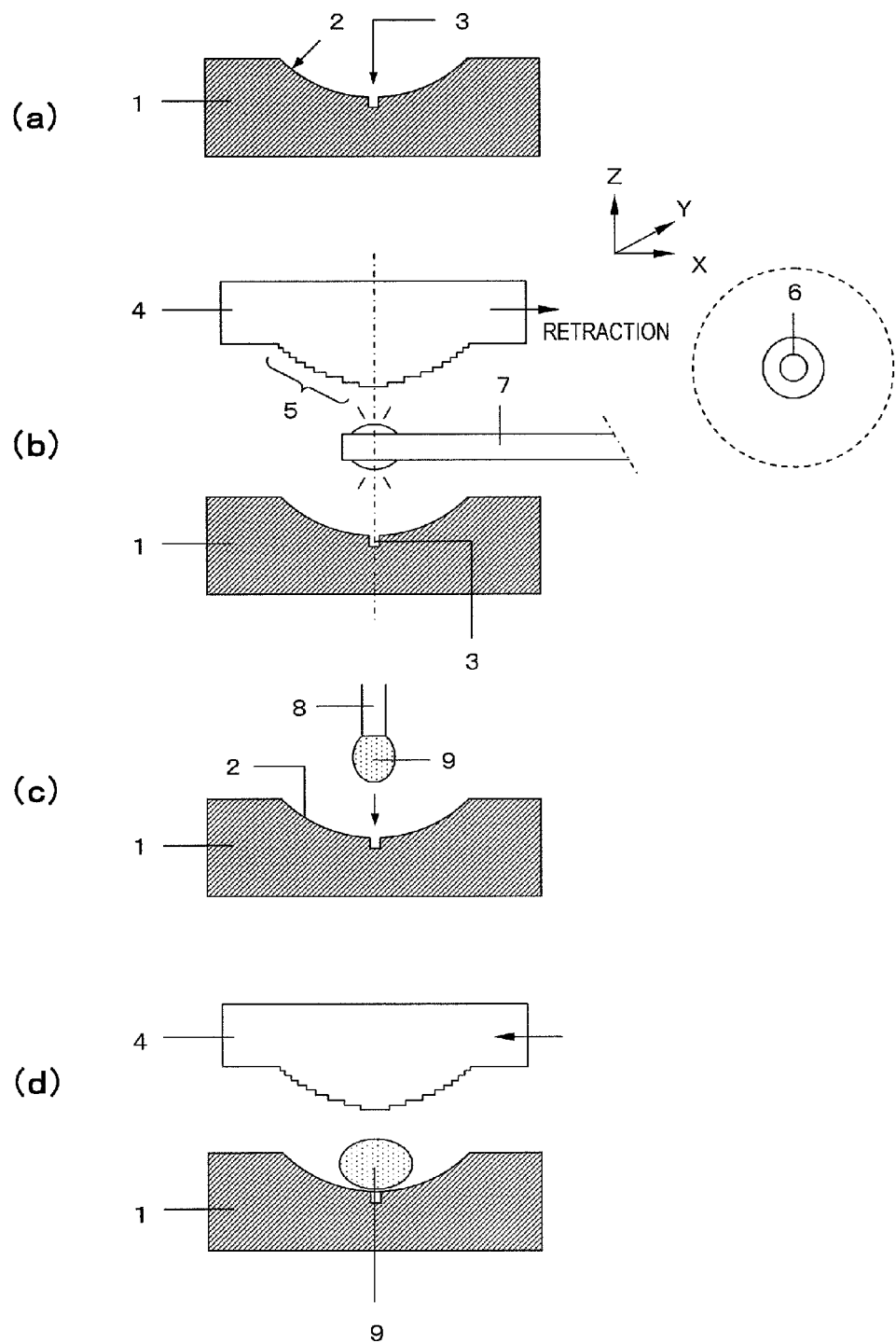
FIGS. 1(a) through (d) show a method for producing a diffraction optical element according to Embodiment 1 of the present invention.
Figure 2:
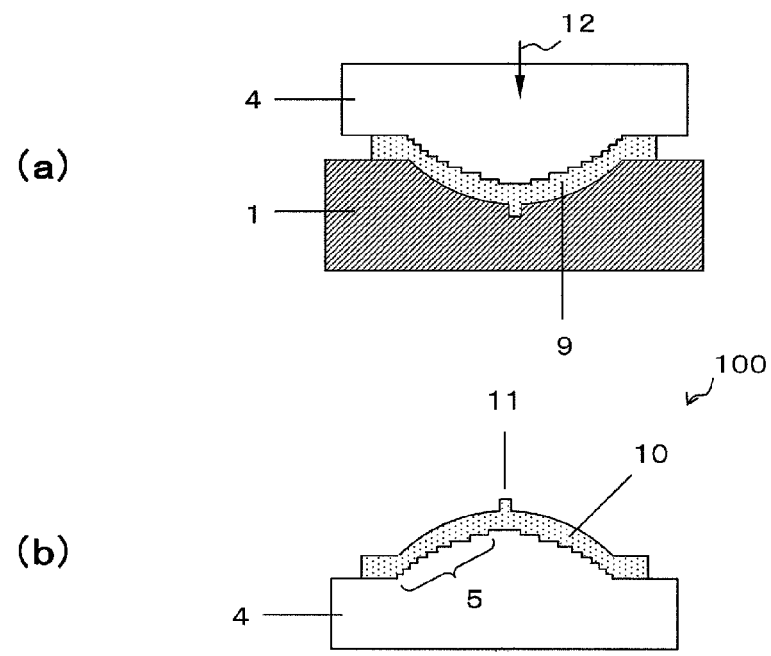
FIGS. 2(a) and (b) show the method for producing the diffraction optical element according to Embodiment 1 of the present invention.

FIG. 1 and FIG. 2 show a method for producing a diffraction optical element according to Embodiment 1 of the present invention. With reference to FIG. 1 and FIG. 2, a method for producing a diffraction optical element at high precision by recognizing the center of a substrate of a diffraction lens, which is the diffraction optical element, and the center of a molding face of a mold will be described.

FIG. 1(a) is a vertical cross-sectional view showing a structure of a mold, which is used for forming a nanocomposite film (optical adjusting layer) on a substrate having a diffraction grating formed at a surface thereof (hereinafter, this substrate will be referred to as the "lens substrate").

The nanocomposite film covering and adhering to the surface of the lens substrate is put into a proper state by transferring the shape of the mold. A molding face 2 of a mold 1 has a concaved shape which defines the shape of the nanocomposite film to be formed. At the center of the molding face 2, a marker 3 having a width of about several micrometers (dent in FIG. 1(a)) is formed.

As the material of the lens substrate, a resin such as polycarbonate or the like is used. As the material of the nanocomposite, a resin such as an acrylic resin or the like containing inorganic particles is used. The inorganic particles are, for example, microparticles containing at least one of zirconium oxide, yttrium oxide, lanthanum oxide, alumina, silica and the like as a main component. In order to decrease the wavelength dependence of the diffraction efficiency, it is preferable that the optical material of the lens substrate is a material which has a lower refractive index and is more highly dispersable than the optical material of the optical adjusting layer (nanocomposite material).

The marker 3 is the dent (concaved portion) in this embodiment, but is not limited to this and may be a protrusion (convexed portion) having the same shape as the dent. The marker 3 preferably has a length of 50 μm or less along the molding face and a depth of 50 μm or less from the molding face. With a size in such a range, the trace of the marker 3 formed on the optical adjusting layer does not influence the optical characteristics of the diffraction optical element as a finished item.

The planar shape of the marker 3 along the molding face 2 is not limited to any specific shape, and may be any shape as long as the position of the marker 3 is recognized, for example, a square shape, a triangular shape, a shape of a cross or the like instead of a general circular shape.

Next, as shown in FIG. 1(b), a surface of a lens substrate 4 at which a diffraction grating 5 is formed is provided to face the mold 1. The lens substrate 4 is moved in an X-Y direction (shown in the figure) for positioning such that the center of the mold 1 and the center of the lens substrate 4 are matched to each other.

In this embodiment, the side of the lens substrate 4 is used as the side to be moved. The present invention is not limited to this, and the side of the mold 1 may be used as the side to be moved. Namely, it is acceptable as long as one of the sides is fixed and the other side is moved. Alternatively, both of the lens substrate 4 and the mold 1 may be moved for positioning.

The positioning of the center of the molding face 2 of the mold 1 and the center of the lens substrate 4 is realized by recognizing, on the same axis, the marker 3 formed at the center of the mold 1 and the center of an innermost diffraction ring band 6 (shown in a right part of FIG. 1(b)) of the diffraction grating formed at the lens substrate 4. As an example of recognition means for positioning, a camera 7 capable of recognizing, at the same time, shooting subjects located at upper and lower positions and acquiring images thereof on the same axis was used. The center of the lens substrate 4 was found by calculation based on coordinates of a plurality of points on the diffraction ring band 6.

Figure 3:
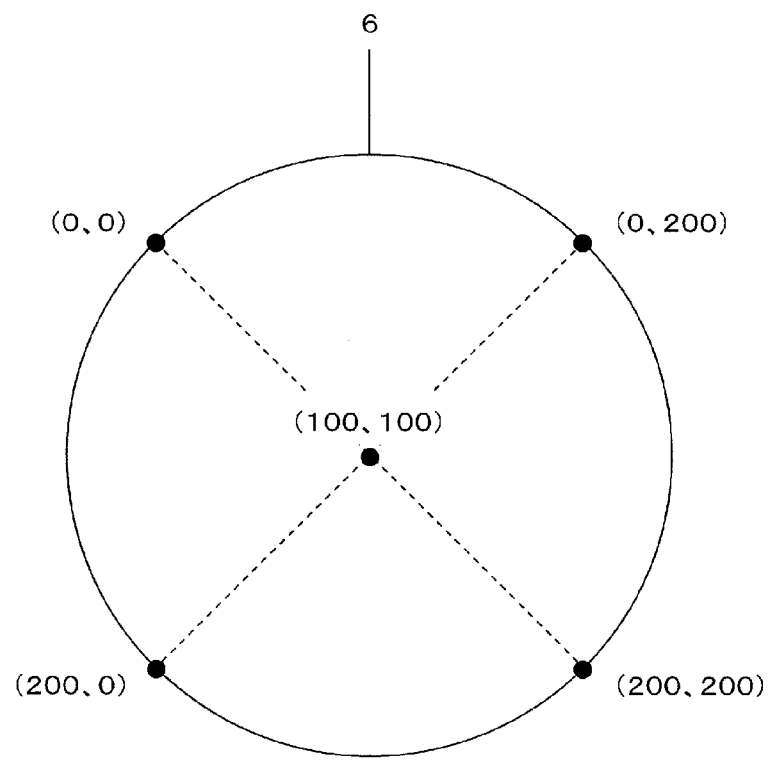
FIG. 3 shows how to find the center of a lens substrate according to Embodiment 1 of the present invention.

An example of a method for finding the center of the lens substrate 4 will be described with reference to FIG. 3. FIG. 3 shows a method for finding the center based on the coordinates on the diffraction ring band 6 of the diffracting grating. First, four pairs of coordinates (0,0), (0,200), (200,0) and (200,200) shown in FIG. 3 are measured. Next, an intersection of a diagonal direction connecting the pairs of coordinates (0,0) and (200,200) and a diagonal direction connecting the pairs of coordinates (0,200) and (200,0), i.e., the intersection at (100,100), is detected. The detected intersection at (100,100) is set as the center of the diffraction ring band 6 (i.e., the center of the diffraction grating 5).

There is a method for finding the center without using calculation. According to this method, the shape of the circle of the diffraction ring band 6 itself of the diffraction grating is used. The diffraction grating 5 has a concentric structure formed around the center of the lens substrate 4. Therefore, the center is necessarily derived by recognizing the edge of the circle of the diffraction grating at high precision. In this manner, the circle itself of the diffraction ring band 6 may be considered as one marker and used for positioning.

Figure 4:
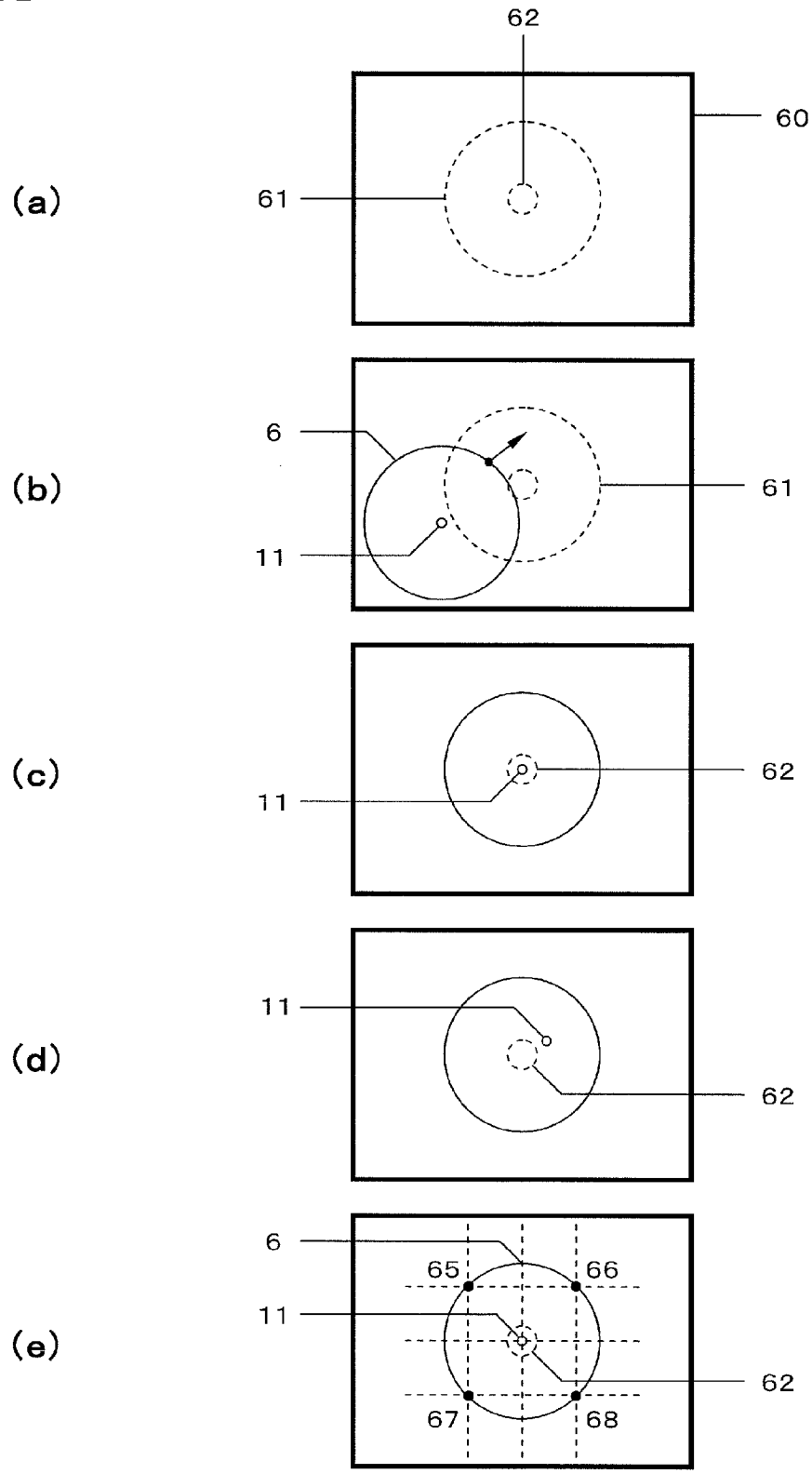
FIGS. 4(a) through (e) show a method for detecting a molding error (decentration) of a diffraction optical element according to Embodiment 2 of the present invention.

Instead of measuring the four pairs of coordinates to find the center as described above, mesh-type grid lines as shown in FIG. 4(e) may be used for positioning. For example, the central position of the lens substrate 4 can be detected by matching a plurality of preset pairs of coordinates 65, 66, 67 and 68 and the edge of the circle of the diffraction ring band 6 to each other. It is desirable that the diffraction ring band 6 is the innermost ring band, but is not limited this and may be any of other ring bands.

In this manner, position alignment is performed such that the center of the molding face 2 of the mold 1 and the center of the lens substrate 4 are on the same axis. The pairs of coordinates representing the position of the lens substrate 4 at this time are recorded.

Then, the lens substrate 4 is once retracted from the mold 1 to a position at which the surface of the mold 1 is completely exposed.

FIG. 1(c) is a cross-sectional view showing a step of dripping the nanocomposite material to the mold 1. Using a dripping device 8, a nanocomposite material 9 of a prescribed amount is dripped to an area in the vicinity of the bottom of the molding face 2 of the mold 1 in the state where the lens substrate 4 is retracted.

In this embodiment, the nanocomposite material 9 is dripped to the mold 1. The present invention is not limited to this, and a prescribed amount of the nanocomposite material may be dripped to the surface of the lens substrate 4 at which the diffraction grating is formed. In this case also, the diffraction optical element can be produced in substantially the same manner.

FIG. 1(d) is a cross-sectional view showing a state where the lens substrate 4 faces the mold 1 after being moved from the retraction position to the position represented by the recorded pairs of coordinates on the mold. The lens substrate 4 has been moved in accordance with the pairs of coordinates recorded in the step of FIG. 1(b) to a position right above the mold 1 to which the nanocomposite material 9 was dripped.

FIG. 2(a) is a cross-sectional view showing a contact state of the lens substrate 4 and the mold 1. The lens substrate 4 is put face-down toward the mold 1, and the nanocomposite material 9 is held between the lens substrate 4 and the mold 1 while being pushed and spread.

At this point, the lens substrate 4 is not caused to completely adhere to the mold 1 and is stopped at a position at which a certain thickness of the nanocomposite material 9 is secured.

Namely, the lens substrate 1 is stopped in a state where a gap of substantially the same size as that of the thickness of the nanocomposite material 9 is kept between the lens substrate 4 and the mold 1.

In this embodiment, the diffraction grating lens is put face-down, but present invention is not limited to this. In the case where the side of the diffraction grating lens is fixed, the mold may put into a face-down state to be in contact with the nanocomposite material 9.

Next, the composite material 9 is cured in a state where such a contact position is kept. A method for curing may be appropriately chosen in accordance with the type of the resin. For example, heat, ultraviolet, electron beam and the like are usable. Among these, curing with ultraviolet is simple and preferable. In the case where the composite material 9 is ultraviolet-curable, the composite material 9 can be cured by irradiating the composite material 9 with an ultraviolet ray 12 via the lens substrate 4.

FIG. 2(b) is a cross-sectional view showing a finished diffraction optical element 100 obtained as a result of being released and taken out from the mold 1. After being cured, the nanocomposite material becomes a nanocomposite film (optical adjusting layer) 10 and is caused to cover and adhere to the surface of the lens substrate 4 at which the diffraction grating is formed. On the nanocomposite film 10 at the center of the lens substrate 4, a marker 11 having substantially the same size and shape as those of the marker 3 formed in the mold 1 is formed. In accordance with the shape of the marker 3, the marker 11 may be concaved or convexed.

As described above, according to this embodiment, the position alignment of the center of the molding face 2 and the center of the substrate 4 is performed using the marker 3 formed at the center of the molding face 2 of the mold 1 and the shape of the diffraction grating of the substrate 4. Owing to this, the position alignment of the lens substrate 4 and the optical adjusting layer 10 can be performed at high precision, and the diffraction optical element 100 having splendid optical characteristics can be obtained. By using the shape of the diffraction grating 5 for position alignment, a step of separately forming a marker for position alignment on the substrate 4 can be omitted.

The marker 11 formed on a surface of the optical adjusting layer 10 is usable as a marker for positionally aligning the optical axes of optical components at high precision when an optical device (camera or the like) having the diffraction optical element 100 mounted thereon is assembled.

In this embodiment, the camera capable of acquiring images of subjects located at upper and lower positions on the same axis is used for performing alignment such that the marker 3 formed at the center of the mold 1 and the center of the lens substrate 4 are on the same axis. Other methods are usable. For example, an image taken as seen from a rear surface of the lens substrate 4 (surface opposite to the surface facing the mold 1) may be used to perform alignment such that the marker 3 formed at the center of the mold 1 and the center of the lens substrate 4 are on the same axis. According to this method, the step of once retracting the lens substrate 4 in order to apply the nanocomposite material can be omitted.

Embodiment 2

Now, a method for detecting a molding error of the diffraction optical element according to Embodiment 2 of the present invention will be described.

The mold 1 having the marker 3 of a prescribed shape at the center of the molding face 2 as described above is used to mold the nanocomposite film 10 on the substrate 4. With a diffraction optical element structure obtained in this manner, a film molding error of the center of the lens substrate 4, namely, the center of the innermost diffraction ring band 6, and the center of the nanocomposite film (hereinafter, such a molding error will be referred to as the "decentration") can be measured quickly and simply at high precision. An example of a method for detecting the decentration will be described with reference to FIG. 4.

As shown in FIG. 4(a), a circle 61 representing an adjusting position of the innermost diffraction ring band (first sign) and a circle 62 representing a tolerable range for decentration (second sign) are displayed on a monitor 60, such as a CRT or the like, as adjusting positions. The circle 62 is at the center of an area enclosed by the circle 61. The area size ratio of circle A and circle B is about 14:1 in this embodiment, but is not limited to this.

Next, as shown in FIG. 4(b), the diffraction optical element is set at an optional position, and an image of the diffraction ring band 6 is displayed on the monitor 60 with the focus being put on the innermost diffraction ring band 6 (specifically, the edge of the diffraction ring band). At this point, there is no problem even if an image of the marker 11 formed at the center of the nanocomposite film is unclear, although this may be varied in accordance with the thickness of the nanocomposite film or the magnification of the image.

Next, the diffraction optical element is moved by a very short distance (in the direction of the arrow in the figure) such that the circle 61 and the diffraction ring band 6 are positionally matched to each other to realize the state shown in FIG. 4(c).

While this state is kept, the marker 11 formed at the center of the nanocomposite film is focused on. When the marker 11 is located within the circle 62, the molding error of the diffraction optical element is within the tolerable range. Therefore, the diffraction optical element is determined to be acceptable. By contrast, when the marker 11 is located outside the circle 62 as shown in FIG. 4(d), the molding error is outside the tolerable range. Therefore, the diffraction optical element is determined not to be acceptable.

By such a method, a molding error (decentration) can be detected simply at high precision.

An image of an area of the standard (first sign) to be displayed on the monitor 60 is not limited to an image of a circle, and may be an image of a matrix as shown in FIG. 4(e). In this case, a plurality of pairs of coordinates 65, 66, 67 and 68 (four sites in this embodiment) to be matched to the diffraction ring band 6 are preset on the monitor 60, and the diffraction ring band 6 and the pairs of coordinates 65, 66, 67 and 68 are positionally adjusted to match each other. A molding error (decentration) can be detected based on the positional relationship between the circle 62 and the marker 11.

If a sign representing the center, such as the marker in the present invention or the like, is not provided on the nanocomposite film, an investment needs to be made for a special apparatus such as a laser microscope or the like, and moreover a long time is necessary to provide a highly precise determination. These are obstacles to mass production.

The method for detecting a molding error (decentration) in this embodiment is applicable to any diffraction optical element having any marker on an optical adjusting layer, not only to the diffraction optical element 100 in Embodiment 1 having the above-described structure.

Embodiment 3

Figure 5:
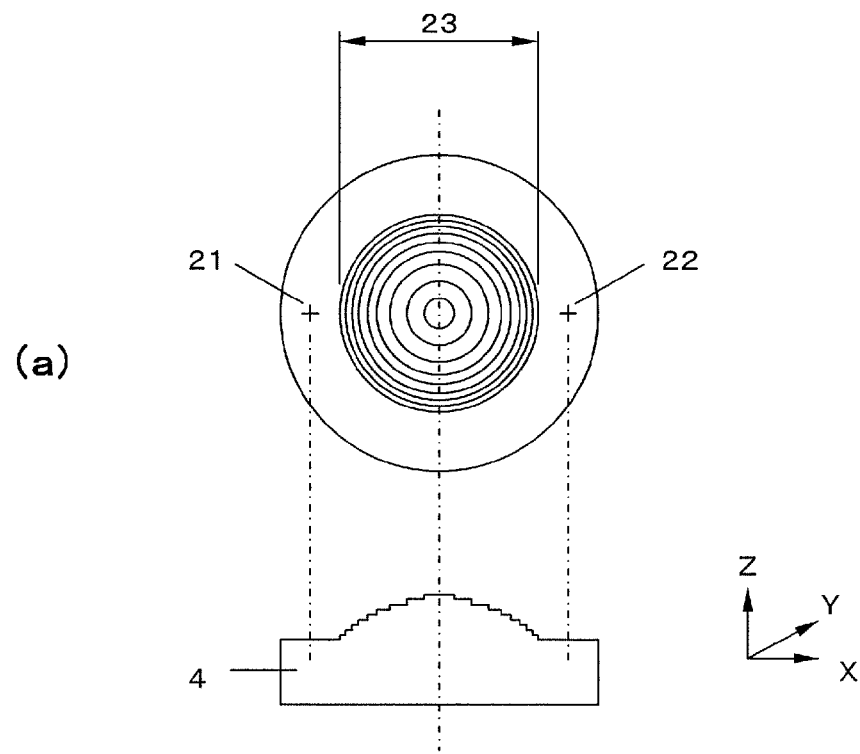
FIGS. 5(a) and (b) show a lens substrate and a mold of a diffraction optical element according to Embodiment 3 of the present invention.
Figure 5:
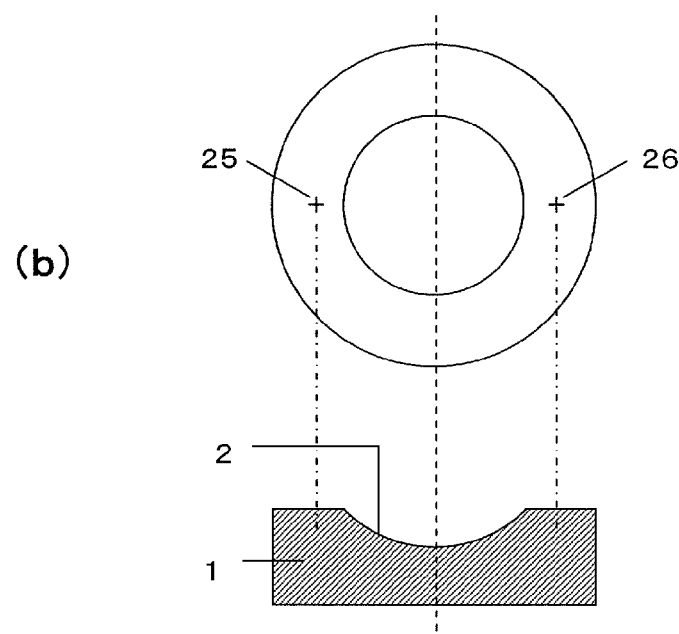

FIG. 5 shows a method for producing a diffraction optical element according to Embodiment 3 of the present invention. FIG. 5(a) shows a plan view and a cross-sectional view of a lens substrate 4, and FIG. 5(b) shows a plan view and a cross-sectional view of a mold 1.

Even when the lens substrate 4 and the mold 1 shown in FIG. 5 are used instead of the marker recognition method described in Embodiment 1, a diffraction optical element which is substantially the same as that of Embodiment 1 can be obtained.

The lens substrate 4 shown in FIG. 5(a) has recognition markers 21 and 22 on an outer circumferential area which is outer to a surface 23 at which the diffraction grating is formed.

The mold 1 shown in FIG. 5(b) has recognition markers 25 and 26 on an outer circumferential area which is outer to a concaved molding face 2.

In the case where the side of the lens substrate 4 is to be moved, the positioning is performed in three axial directions of X-Y-Z (shown in the figure). The positioning is performed by moving the lens substrate 4 such that the markers 21 and 22 formed on the lens substrate 4 match the markers 25 and 26 formed on the mold 1. The rest of the process is the same as that described in Embodiment 1. By this method, a diffraction optical element providing the same performances as those of the diffraction optical element in Embodiment 1 can be obtained.

Embodiment 4

With reference to FIGS. 6(a) through (d), a method for producing a diffraction optical element by which molds are positioned to form a nanocomposite film, unlike the production method by which the diffraction ring band of the lens substrate and the marker(s) of the mold are recognized for positioning, will be described.

Figure 6:
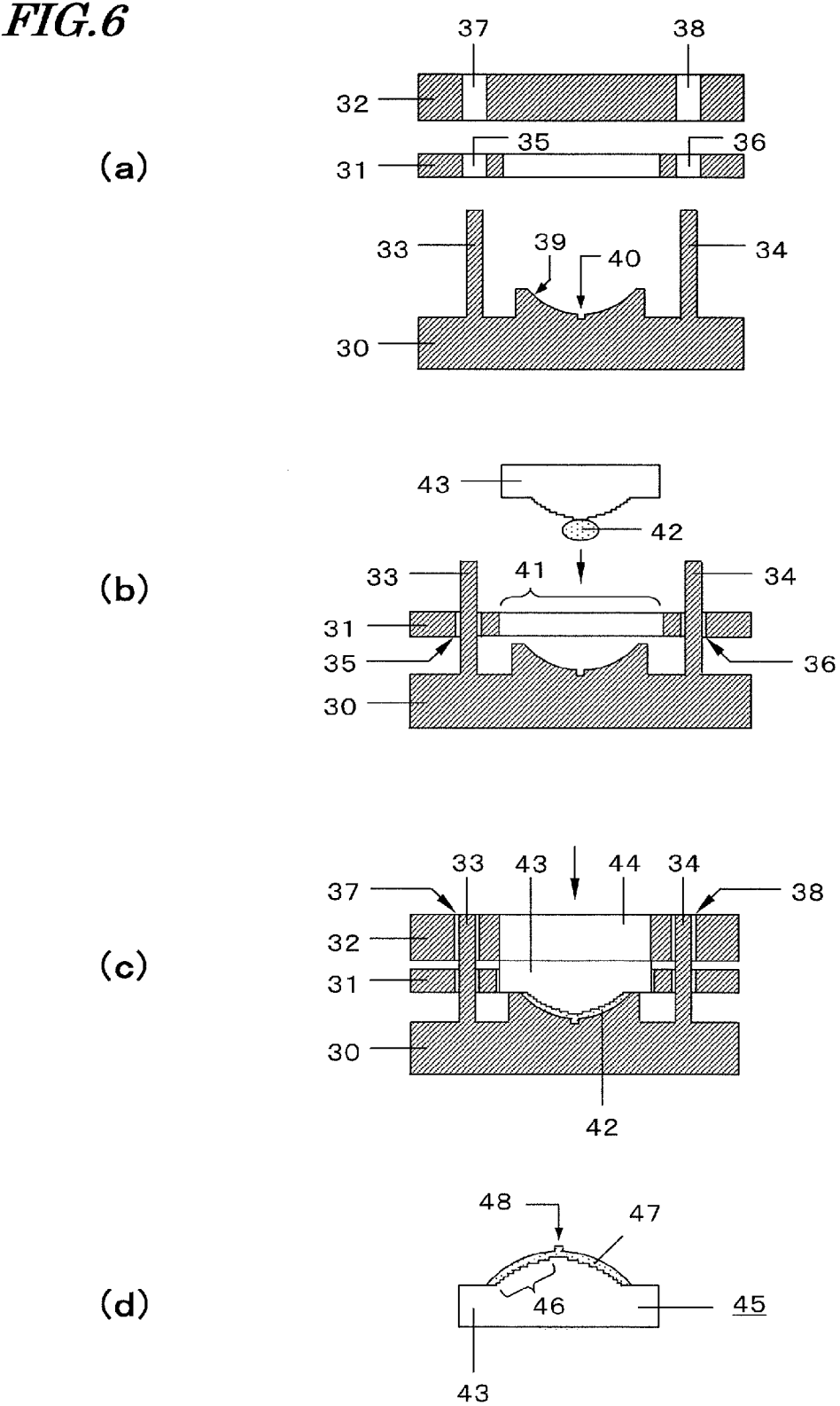
FIGS. 6(a) through (d) show a method for producing a diffraction optical element according to Embodiment 4 of the present invention, by which positioning is performed only by molds.

FIG. 6(a) is a cross-sectional view showing a mold which is used when the position of the lens substrate and the position of the mold are regulated only by the mold to form a nanocomposite film.

The mold in this embodiment includes a lower mold 30 for regulating the shape of the nanocomposite film, a regulating mold 31 for holding the lens substrate and regulating the positions of the lower mold 30 and the lens substrate, and an upper mold 32 for pressing the lens substrate toward the lower mold 30.

Position regulating pins 33 and 34 formed on the lower mold 30 are respectively engageable with through-holes 35 and 36 of the regulating mold 31 and also through-holes 37 and 38 of the upper mold 32 at high precision. The lower mold 30 has a concaved portion 40 of a prescribed size at the center of a curved portion 39. The shape of the concaved portion 40 is transferred to the nanocomposite film.

A marker to be formed on a surface of the nanocomposite film by the concaved portion 40 is used as a sign for finding the center of the diffraction optical element when the shape of the diffraction optical element is evaluated.

FIG. 6(b) is a cross-sectional view showing a state where the lower mold 30 and the regulating mold 31 are put together and a state where the lens substrate 4 is to be mounted. First, the position regulating pins 33 and 34 of the lower mold 30 are fit into the through-holes 35 and 36 of the regulating mold 31. Next, a lens substrate 43 having a nanocomposite material 42 of a prescribed amount dripped thereto in advance is inverted such that the nanocomposite material 42 can contact the mold 30, and is fit into a lens holding part 41 formed in the regulating mold 31.

In this embodiment, the nanocomposite material is dripped to the lens substrate 43, but the present invention is not limited to this. The same amount of nanocomposite material may be dripped to the lower mold 30.

FIG. 6(c) is a cross-sectional view showing a state where the upper mold 32 is mounted. The upper mold 32 is mounted as adhering to a rear side of the lens substrate 43 shown in FIG. 6(b). The assembly is performed by fitting the position regulating pins 33 and 34 of the lower mold 30 into the through-holes 37 and 38 of the upper mold 32 after the positions thereof are matched to each other.

Although not shown, the molds 30, 31 and 32 which have been put together can be fixed as follows, for example. Screws of a prescribed size are formed on outer circumferences of the positional regulating pins 33 and 34 formed on the lower mold 30, and nuts are attached and tightened to the screws. In this case, the lens substrate 43 and the lower mold 30 are structured to have a prescribed size of gap therebetween even where the lens substrate 43 and the lower mold 30 completely adhere to each other. This gap is filled with the nanocomposite material 42.

While this adhering state is kept, an ultraviolet ray of a prescribed wavelength is taken in from an open window 44 formed at the center of the upper mold 32, and the nanocomposite material 42 is cured by irradiating the nanocomposite material 42 with the ultraviolet ray via the lens substrate 43. The nanocomposite material 42 is, for example, photocurable, and in this embodiment, is ultraviolet-curable. The material 42 can be cured by being irradiated with an electromagnetic wave, such as light or the like, having a desired wavelength in accordance with the property of the material 42.

The lower mold 30 may be formed of a photo-transmissive material, for example, glass or the like. In this case, the material 42 can be cured by being irradiated with desired light (electromagnetic wave) directed via the lower mold 30. Similarly, the upper mold 32 and the regulating mold 31 may be formed of a photo-transmissive material. In this case, the material 42 can be cured by being irradiated with desired light (electromagnetic wave) directed via the upper mold 32 and the regulating mold 31. In the case where the material 42 is thermosetting, heat is applied to cure the material 42.

FIG. 6(d) is a cross-sectional view showing a finished diffraction optical element 45. After the nanocomposite material 42 is cured, the mold is opened and the lens substrate 43 is taken out. Then, the diffraction optical element 45 having a nanocomposite film 47 formed on a surface 46 of the lens substrate 43 at which the diffraction grating is formed is completed. On the nanocomposite film 47 at the center of the diffraction optical element 45, a marker 48 of a prescribed size which is obtained by transferring the shape of the mold is formed.

INDUSTRIAL APPLICABILITY

The present invention is especially useful in the field of a diffraction optical element and a method for producing the same.

REFERENCE SIGNS LIST

1 Mold
2 Molding face
3 Marker
4 Lens substrate
5 Diffraction grating
6 Diffraction ring band
7 Camera
8 Dripping device
9 Nanocomposite material
10 Optical adjusting layer
11 Marker

The invention claimed is:

1. A method for producing a diffraction optical element, wherein the diffraction optical element includes:
   a substrate formed of a first optical material containing a first resin and having a diffraction grating configuration at a surface thereof; and
   an optical adjusting layer formed of a second optical material containing a second resin and formed on the diffraction grating configuration of the substrate;
   the method comprising the steps of:
   positionally aligning a center of a molding face of a mold and a center of the diffraction grating configuration of the substrate, based on a marker of a prescribed shape which is formed at the center of the molding face of the mold and the diffraction grating configuration of the substrate;
   locating a starting material of the second optical material between the molding face of the mold and the diffraction grating configuration of the substrate; and
   pressing the starting material of the second optical material by the mold and the substrate to form the optical adjusting layer on the diffraction grating configuration;
   wherein the step of positionally aligning includes the step of positionally aligning the center of the diffraction grating configuration found based on a plurality of pairs of coordinates on the diffraction grating configuration and the marker.

2. The method for producing a diffraction optical element of claim 1, wherein the marker is a concaved portion or a convexed portion formed at the molding face.

3. The method for producing a diffraction optical element of claim 1, wherein the marker has a length of 50 μm or less along the molding face and a depth of 50 μm or less from the molding face.

4. A method for producing a diffraction optical element, wherein the diffraction optical element includes:
   a substrate formed of a first optical material containing a first resin and having a diffraction grating configuration at a surface thereof; and
   an optical adjusting layer formed of a second optical material containing a second resin and formed on the diffraction grating configuration of the substrate;
   the method comprising the steps of:
   positionally aligning a center of a molding face of a mold and a center of the diffraction grating configuration of the substrate, based on a marker of a prescribed shape which is formed at the center of the molding face of the mold and the diffraction grating configuration of the substrate;
   locating a starting material of the second optical material between the molding face of the mold and the diffraction grating configuration of the substrate; and
   pressing the starting material of the second optical material by the mold and the substrate to form the optical adjusting layer on the diffraction grating configuration;
   wherein the step of positionally aligning includes the step of positionally aligning a ring band of the diffraction grating configuration and the marker.

5. A method for producing a diffraction optical element, wherein the diffraction optical element includes:
   a substrate formed of a first optical material containing a first resin and having a diffraction grating configuration at a surface thereof; and
   an optical adjusting layer formed of a second optical material containing a second resin and formed on the diffraction grating configuration of the substrate;
   the method comprising the steps of:
   positionally aligning a center of a molding face of a mold and a center of the diffraction grating configuration of the substrate, based on a marker of a prescribed shape which is formed at the center of the molding face of the mold and the diffraction grating configuration of the substrate;
   locating a starting material of the second optical material between the molding face of the mold and the diffraction grating configuration of the substrate; and
   pressing the starting material of the second optical material by the mold and the substrate to form the optical adjusting layer on the diffraction grating configuration;
   wherein the step of positionally aligning includes the step of positionally aligning an innermost ring band of the diffraction grating configuration and the marker.

6. A method for producing a diffraction optical element, wherein the diffraction optical element includes:
   a substrate formed of a first optical material containing a first resin and having a diffraction grating configuration at a surface thereof; and
   an optical adjusting layer formed of a second optical material containing a second resin and formed on the diffraction grating configuration of the substrate;
   the method comprising the steps of:
   positionally aligning a center of a molding face of a mold and a center of the diffraction grating configuration of the substrate, based on a marker of a prescribed shape which is formed at the center of the molding face of the mold and the diffraction grating configuration of the substrate;
   locating a starting material of the second optical material between the molding face of the mold and the diffraction grating configuration of the substrate; and
   pressing the starting material of the second optical material by the mold and the substrate to form the optical adjusting layer on the diffraction grating configuration;
   wherein the step of positionally aligning includes the steps of:
   detecting an innermost ring band of the diffraction grating configuration; and
   setting the marker at a position inner to the innermost ring band.

* * * * *